United States Patent

[11] 3,631,397

[72] Inventors Sadayuki Mitsuhashi;
    Takeo Shinohara, both of Tokyo-to, Japan
[21] Appl. No. 839,039
[22] Filed July 3, 1969
[45] Patented Dec. 28, 1971
[73] Assignee Nippon Electric Company, Limited
    Tokyo-to, Japan
[32] Priority July 10, 1968
[33] Japan
[31] 43/48690

[54] SIGNAL SWITCHING DEVICE
    12 Claims, 10 Drawing Figs.
[52] U.S. Cl. ................................................ 340/166 S,
    317/137, 317/155.5
[51] Int. Cl. ........................................... G11b 5/00,
    H04g 9/00
[50] Field of Search ............................................ 340/166,
    166 S; 179/18 GE; 317/137, 155.5

[56] References Cited
    UNITED STATES PATENTS
3,355,725  11/1967  McKeon .................... 340/166 X
3,435,417  3/1969   Haselton, Jr. ............... 340/166
3,448,435  6/1969   Billhardt ..................... 340/166
3,483,516  12/1969  Arndt ......................... 340/166
3,518,626  6/1970   Canceill et al. ............. 340/166

Primary Examiner—Donald J. Yusko
Attorney—Marn & Jangarathis

ABSTRACT: A cross point signaling switch including unidirectional conductive diodes, magnetic cores and groups of electric windings wound on the cores for interconnection with input and output control lines to cause current to flow in predetermined windings at predetermined cross points aligned with preselected input and output control lines to activate the cores associated therewith to produce magnetic fields to move the overlapping adjacent reeds ends into engagement at preselected cross points to connect the input and output signaling lines thereat and at the same time to move overlapping adjacent reeds ends out of engagement as engaged at other cross points aligned with the preselected cross points to disconnect the input and output signaling lines thereat, without disturbing the signaling connection at the preselected cross points.

PATENTED DEC28 1971 3,631,397

PRIOR ART

INVENTORS
Sadayuki Mitsuhashi
Takeo Shinohara

BY *Marn & Jangarathis*

ATTORNEYS

3,631,397
Fig. 3. PRIOR ART
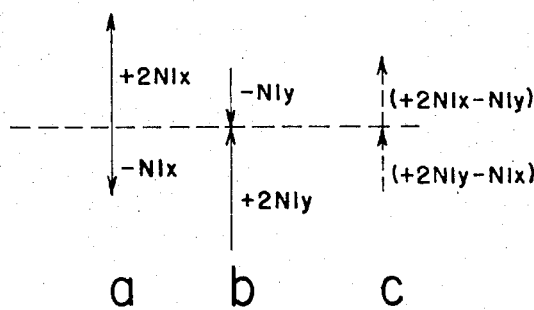
a  b  c
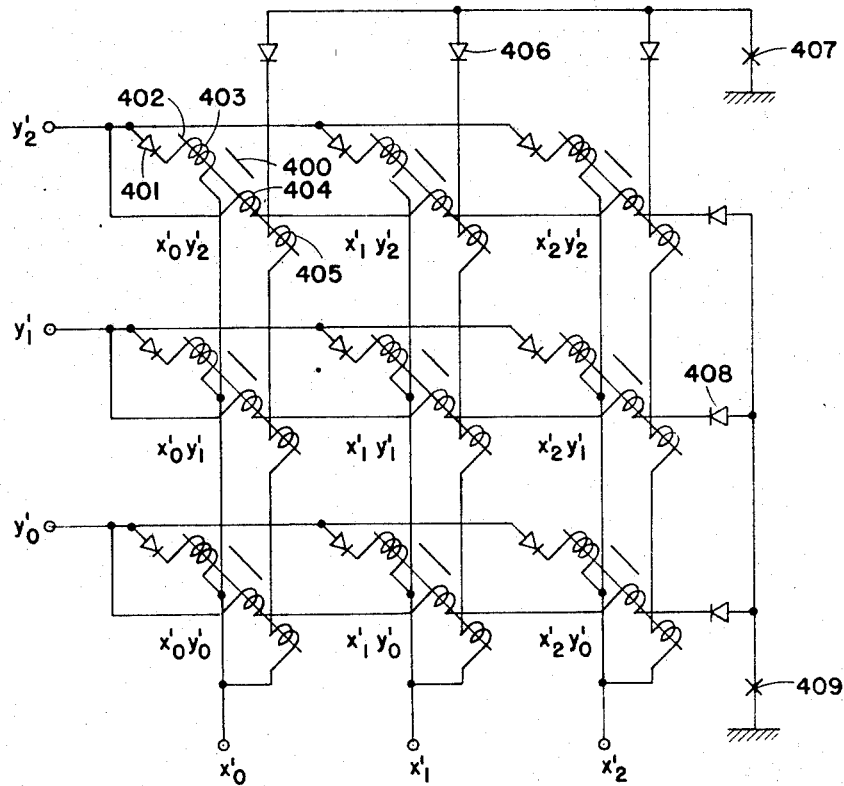
Fig. 4.
INVENTORS
Sadayuki Mitsuhashi
Takeo Shinohara
BY *Marn & Jangarathis*
ATTORNEYS

SIGNAL SWITCHING DEVICE

BRIEF EXPLANATION OF THE DRAWING

This invention relates to a cross point signal-switching device, and more particularly to such switching device in which control signals are applied to input and output control lines for electromagnetically actuating switching elements disposed at cross points of preselected input and output signal lines to establish signaling connections therebetween.

A conventional type of cross point-switching device known in the prior art as including four different windings and movable switching elements at each switching cross point is often used with hybrid electronic computers, an information synthesizer/discomposer, data processing systems, and the like. It is operated in such manner that the switching elements close when the first through fourth windings are simultaneously excited, and release when either the first and second windings or the third and fourth windings are excited.

Such conventional cross point signal switching device is disadvantageous on the following points:

1. A switching element is released when either the first and the second windings or the third and the fourth windings are excited. By this operation, the switching elements located at other cross points which are common to the input control lines or the output control lines are automatically restored. It is therefore difficult to realize multiplex connection of the switching elements.

2. The windings located at other cross points series connected with the input control lines or output control lines are inevitably excited when selecting only the switching element located at a specific cross point. Therefore the windings must have large impedance and require large driving power.

Eliminating these disadvantages, the present invention provides a signal switching device comprising:
parallel input signal lines; parallel output signal lines which substantially cross the input signal lines perpendicularly; switching elements disposed at the respective cross points of the input signal lines and the output signal lines so that the switching elements connect or release between the input signal lines and output signal lines; input control lines corresponding to the output signal lines; output control lines corresponding to the output signal lines; diodes connected to the input and output control lines at the respective cross points thereof and poled in a specific direction to bridge the corresponding input control lines and output control lines; first magnetic cores for providing bias magnetic fields which are disposed so that these cores can be magnetically coupled with the switching elements; second magnetic cores which are disposed so that these cores can be magnetically coupled with the switching elements, and which are easily magnetized and have residual magnetism, fields; selective exciting windings which are electrically connected in series to the diodes and wound on the second magnetic cores so as to produce magnetomotive force in the direction to strengthen the bias magnetic fields, and which selectively operate the switching elements; and reset exciting windings which are commonly connected to at least one of each of the input and output control lines, and which produce magnetomotive force in the direction to cancel the bias magnetic fields, and which are wound on the respective second magnetic cores so as to produce smaller magnetomotive forces than those of the selective exciting windings and thus to release the corresponding switching elements.

Figure 1:
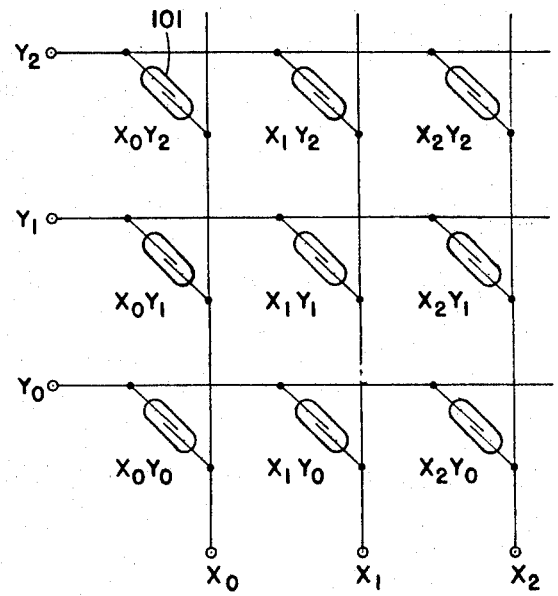
Figure 2:
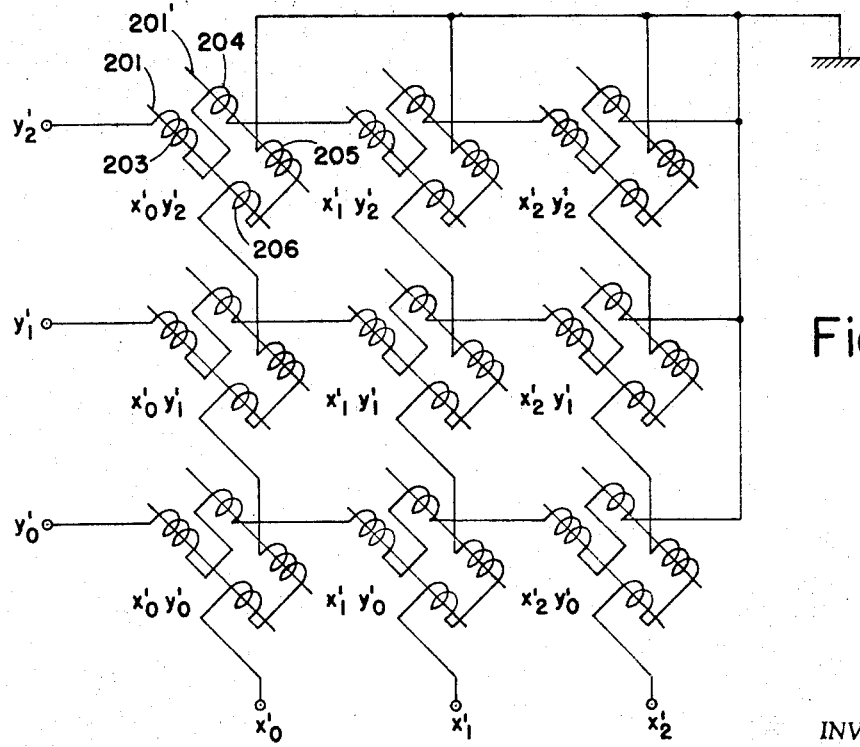
Figure 5A:
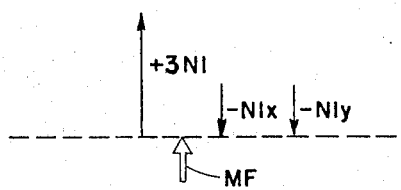
Figure 6:
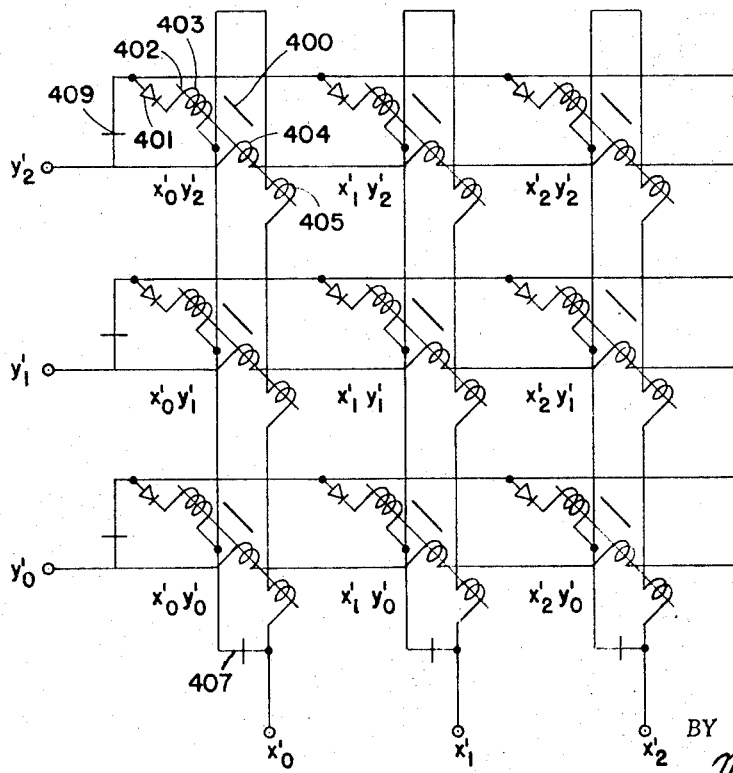
Figure 7:
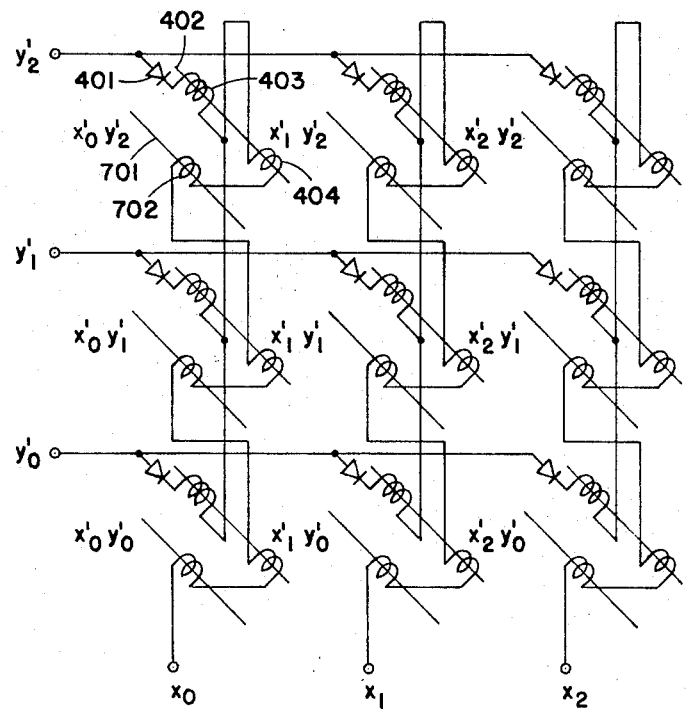
Figure 8:
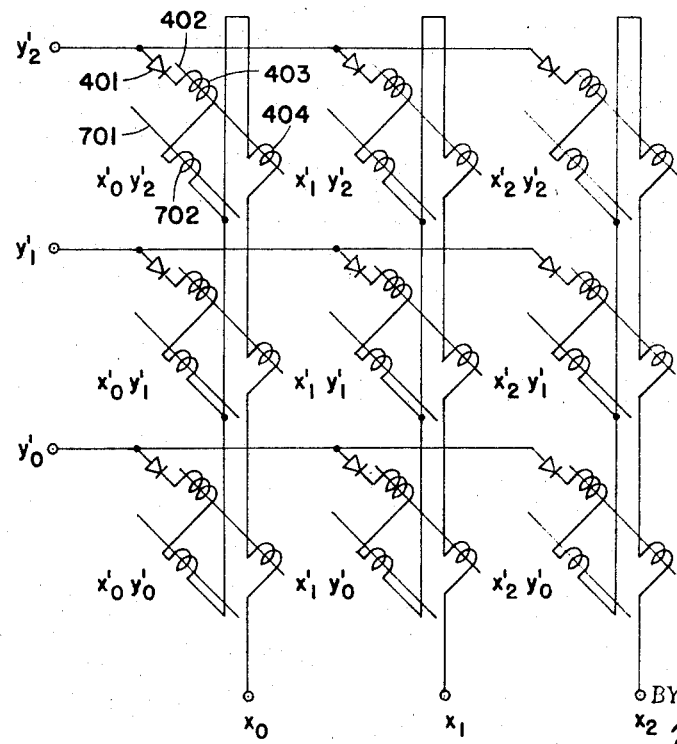

The invention will be explained more specifically by referring to the appended drawings in which:

FIG. 1 shows a schematic circuit arrangement of the signal lines part of a cross point switching device according to the prior art;

FIG. 2 shows a schematic circuit arrangement of the input and output signal control lines associated with the corresponding input and output signal lines in FIG. 1 according to the prior art;

FIGS. 3a, b and c show a family of vectors indicating the direction and the magnitude of the magnetomotive forces due to the selective exciting windings and the reset exciting windings of the input and output control lines part of FIG. 2;

FIG. 4 is a schematic circuit arrangement of a first embodiment of the input and output control lines part of a cross point switching device according to the present invention;

FIGS. 5a, b and c show a family of vectors indicating the direction and the magnitude of the magnetomotive forces due to the selective and exciting windings in FIGS. 4, 7 and 8; and FIGS. 6, 7 and 8 show schematic circuit arrangements of modifications of FIG. 4.

Referring to FIGS. 1 and 2, the conventional signal switching device consists of a signal line part and a control line part. The signal line part (FIG. 1) comprises: parallel input signal lines $Y_o$, $Y_1$ and $Y_2$; output signal lines $X_o$, $X_1$ and $X_2$ perpendicularly crossing the input signal lines $Y_o$, $Y_1$ and $Y_2$; and switching elements 101 comprising magnetic reeds having overlapping adjacent ends and disposed at the respective cross points of the input signal lines $Y_o$, $Y_1$ and $Y_2$ and output signal lines $X_o$, $X_1$ and $X_2$ in such a manner that the switching elements 101 connect or release between the corresponding input signal lines $Y_o$, $y_1$ and $Y_2$ and output signal lines $X_o$, $X_1$ and $X_2$.

The control line part (FIG. 2) comprises: input control lines $Y_o'$, $Y_1'$ and $Y_2'$ corresponding to the input signal lines $Y_o$, $Y_1$ and $Y_2$, respectively; output control lines $x_o'$, $X_1'$ and $X_2'$ corresponding to the output signal lines $X_o$, $X_1$ and $X_2$, respectively; magnetic cores 201 and 201' which are disposed at positions at which these cores can be magnetically coupled with the switching elements 101, and which are easily magnetized by exciting windings and also have residual magnetism; first windings 203 which are connected to said input control lines $Y_o'$, $Y_1'$ and $Y_2'$ and wound on the magnetic cores 201; second windings 204 which are connected to the input lines $Y_o'$, $Y_1'$ and $Y_2'$ and wound on the magnetic cores 201' in such a manner that the winding direction is opposite to that of the windings 203 and the number of turns of each winding 204 is half that of each winding 203; third windings 205 which are connected to the output control lines $X_o'$, $X_1'$ and $X_2'$ and wound on the magnetic cores 201' in such manner that the winding direction and number of turns are same as those of the first winding 203; and fourth windings 206 which are connected to the output control lines $X_o'$, $X_1'$ and $X_2'$ and wound on the magnetic cores 201 in such manner that the winding direction and number of turns are the same as those of the second windings 204.

Referring to FIGS. 1 and 2 in comparison with FIG. 3, the signal switching device as shown in FIGS. 1 and 2 is operated in such a manner that when a control signal is applied to the input control line $Y_1'$ and output control line $X_1'$ the first winding 203 through fourth winding 206 are all excited at the cross point ($X_1'Y_1'$) as shown in FIG. 2 and consequently the magnetic cores 201 and 201' are magnetized in the arrow direction (broken line) of FIG. 3(c) whereby the corresponding switching element 101 ($X_1Y_1$) in FIG. 1 is closed. The first winding 203 and second winding 204 located at the cross points ($X_o'Y_1'$) and ($X_2'Y_1'$) which are aligned horizontally are excited and thus the respective magnetic cores 201 and 201' are magnetized in the arrow direction (full line) of FIG. 3(b). By this, the corresponding switching elements 101 ($X_oY_1$) and $X_2Y_1$) in FIG. 1 are released. Also, the third windings 205 and fourth windings 206 are disposed at the cross points 101 ($X_1Y_2$) and ($X_1Y_o$) which are aligned vertically are excited and thus magnetized in the arrow direction (full line) of FIG. 3(a). As the result, the corresponding switching elements 101 ($X_1Y_2$) and ($X_1$ and $Y_o$) in FIG. 1 are released.

FIGS. 1 and 4 show a signal switching device embodying this invention, which comprises a signal line part and control line part. The signal line part is exactly same as that shown in FIG. 1.

The control line part (FIG. 4) comprises: input control lines $Y_o'$, $Y_1'$ and $Y_2'$ corresponding to the input signal lines $Y_o$, $Y_1$ and $Y_2$, respectively, in FIG. 1; output control lines $X_o'$, $X_1'$ and $X_2'$ corresponding to the output signal lines $X_o$, and $X_1$ and $X_2$, respectively, in FIG. 1; permanent magnets 400 located at positions so as to be magnetically coupled with the switching elements 101 for producing thereat permanent bias magnetic fields; magnetic cores 402 made of magnetically semihard material and disposed at positions so as to be magnetically coupled with the switching elements 101, the latter cores having a square hysteresis loop and possessing residual magnetism to cancel or to strengthen the bias magnetic fields of the cores 400; diodes 401 poled in the direction to selectively connect the circuits between the input control lines $Y_o'$, $Y_1'$ and $Y_2'$ to the output control lines $X_o'$, $X_1'$ and $X_2'$, respectively, so that the diodes 401 bridge the input control lines $Y_o'$, $Y_1'$ and $Y_2'$ and the output control lines $X_o'$, $X_1'$ and $X_2'$, respectively, at their cross points; selective exciting windings 403 electrically connected in series to the diodes 401 and wound on the magnetic cores 402 so as to produce magnetomotive forces effective in the direction to strengthen the bias magnetic fields of the cores 400 for closing the switching elements 101; horizontal direction reset exciting windings 404 wound on the magnetic cores 402 aligned in the horizontal direction and having corresponding one ends connected to the input control lines $Y_o'$, $Y_1'$ and $Y_2'$ and other ends grounded via diodes 408 and horizontal reset control switches 409 for producing magnetomotive forces effective in the direction to cancel the bias magnetic fields of cores 400 and having a magnitude approximately equal to one third of the magnetomotive forces produced by the respective selective exciting windings 403 to release the switching elements 101 aligned in horizontal direction; and vertical direction reset exciting windings 405 wound on the magnetic cores 402 aligned in the vertical direction and having corresponding one ends connected to the output control lines $X_o'$, $X_1'$ and $X_2'$ and other ends grounded by way of diodes 406 and vertical reset control switches 407 for producing magnetomotive forces effective in the direction to cancel the bias magnetic fields of the cores 400 and having a magnitude approximately equal to one third of the magnetomotive forces produced by the respective selective exciting winding 403.

In the signal switching device as shown in FIGS. 1 and 4, when, for example, the switching element 101 located at the cross point $(X_1Y_1)$ is to be selectively closed, a selective exciting current pulse flows in the circuit: terminal of input control line $Y_1'$, diode 401 $(X_1'Y_1')$, winding 403 $(X_1'Y_1')$, and terminal of output control line $X_1'$ by applying a negative potential voltage to the output control line $X_1'$, and a positive potential voltage to the input control line $Y_1'$. By this, the magnetic core 402 is magnetized in a definite direction to aid the bias magnetic field of core 400 and thus the switching element 101 $(X_1Y_1)$ is closed.

When the switching element 101 at cross point $(X_1Y_1)$ is selectively closed and at the same time by the same control signal the switching elements 101 (in the closed state) of other cross points $(X_oY_1)$ and $(X_2Y_1)$ aligned with cross point $(X_1Y_1)$ in horizontal direction are to be released, a reset exciting current pulse flows in the circuit: ground, switch 409, diode 408, winding 404 $(X_2'Y_1')$, winding 404 $(X_1'Y_1')$, winding 404 $(X_o'Y_1')$, and terminal of output control line $X_1'$ by closing the switch contact 409, and a selective exciting current pulse flows in the circuit; terminal of input line $Y_1'$, diode 401 $(X_1'Y_{A1}')$, winding 403 $(X_1'Y_1')$, and the terminal of output line $X_1'$, by applying a positive potential voltage to line $Y_1'$ and a negative one to line $X_1'$, and thus the closed switching elements 101 located at the cross points $(X_oY_1)$ and $X_2Y_1)$ aligned in horizontal direction with the switching element $(X_1Y_1)$ are released without disturbing the closure of the selected switching element 101 at cross point $(X_1Y_1)$.

When the switching element 101 of the cross point $(X_1Y_1)$ is selectively closed and at the same time by the same control signal the switching elements 101 (in the closed state) of other cross points $(X_1Y_2)$ and $X_1Y_o)$ aligned with the cross point $(X_1Y_2)$ in the vertical direction are to be released, a reset exciting current pulse flows in the circuit: ground switch contact 407, diode 406, winding 405 $(X_1'Y_2')$, winding 405 $(X_1'Y_1')$, winding 405 $(X_1'Y_o')$, and terminal of line $X_1'$ by closing switch contact 407, and an exciting current pulse flows in the circuit terminal of line $Y_1'$, diode 401 $(X_1'Y_1')$, winding 403 $(X_1'Y_{A1}')$, and terminal of line $X_1'$ by applying a positive potential voltage to line $Y_1'$ and a negative one to line $X_1'$, and thus the closed switching elements 101 of the other cross points $(X_1Y_2)$ and $(X_1Y_o)$ aligned in the vertical direction with the cross point $(X_1Y_1)$ are released without disturbing the closure of the selected switching elements 101 at the cross point $(X_1Y_1)$.

Refer to FIGS. 4 and 5(a), the selective winding 403 is wound on the core 402 $(X_1'Y_1')$ in FIG. 4 in the different direction from the reset windings 404 and 405 wound on the same core 402 (whereby the magnetomotive force of the winding 403 is reversed relative to those of the latter reset windings 404 and 405), and the magnetomotive force (3NI) produced by the selective winding 403 is about three times as large as the magnetomotive forces (NIx and NIy) of the respective latter reset windings 404 and 405. Therefore the magnetic core 402 is excited in the direction of the vector (+3NI) in FIG. 5(a) by magnetomotive force of the selective winding 403 whereby the switching element 101 of the cross point $(X_1Y_1)$ is closed.

Referring to FIG. 5(a), the magnetic core 402 is magnetized by the magnetomotive force ($+3NI-NIx-NIy=+NI$) whereby the total magnetic field of the $+NI$ and the bias magnetomotive force of the core 400 shown by the vector MF is applied to the switching element 101 of the cross point $(X_1Y_1)$. While, at the restoring cross points $X_1'Y_2'$) and $(X_1'Y_o')$ the magnetomotive force produced by the corresponding reset windings 405, namely $-NIx$, is applied to the magnetic core 402, and at the restoring cross points $(X_o'Y_1')$ and $(X_2'Y_1')$, the magnetomotive force produce by the corresponding reset windings 404, namely $-NIy$, is applied to the magnetic core 402, it follows therefrom that the bias magnetism of the core 400 is cancelled by the magnetism of the magnetic core 402 whereby the switching elements 101 at the respective restoring cross points are released.

FIG. 6 shows another embodiment of this invention, wherein the change of connection mode, that is multiplex connection mode and single connection mode are performed by exchange of the control switch contacts 407 and 409 normally closed and disposed so as to short circuit across both ends of the reset windings. For example, when the cross point $(X_1Y_1')$ is selected by a multiplex connection mode, the control switch contacts 407 (line $X_1'$) and 409 (line $Y_1'$) are closed whereby a control pulse current flows in the direction: input control line $Y_1'$, contact 409 ($Y_1'$), diode 401 $(X_1'Y_1')$, winding 403 $(X_1'Y_1')$, contact 407 ($X_1'$), and output control line $X_1'$. When it is desired to restore (open) the switching elements 101 at the cross points of the horizontal signal line and vertical signal line simultaneously as aligned with the selected cross point, the control switch contacts 407 and 409 are released (opened) whereby a control pulse current flows in the circuit: input control line $Y_1'$, winding 404 $(X_o'Y_1')$, winding 404 $(X_1'Y_1')$, winding 404 $(X_2'Y_1')$, diode 401 $(X_1'Y_1')$, winding 403 $(X_1'Y_1')$, winding 405 $(X_1'Y_2')$, winding 405 $(X_1'Y_{A1}')$, winding 405 $(X_1'Y_o')$, and output control line $X_1'$. Therefore, the selection of the cross point $(X_1'Y_1')$ and the reset of the cross points $(X_o'Y_1')$, $(X_2'Y_1')$, $(X_1'Y_2')$ and $(X_1'Y_{oao}')$ are simultaneously performed.

In this embodiment, it is not necessary to use three kinds of control voltage: negative and positive potentials (selective signal) and ground potential (switching mode exchange signal). Selection and reset are simultaneously performed by applying only a voltage pulse to the input and output control lines.

FIG. 7 shows another embodiment of this invention, wherein multiplex connection is employed only for the horizontal signal line, and the vertical signal line is of automatically resetting drive system. This arrangement is a matrix circuit having no control switch to be used for switching connection modes. The numeral reference 701 indicates a magnetic core for providing a bias magnetic field which is always magnetized in the same direction by a magnetizing winding 702 connected in series to the reset winding 404.

Figure 5B:
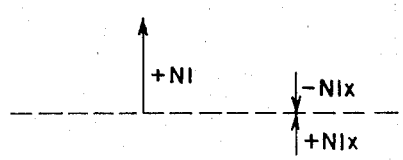

Referring to FIG. 7, the magnetomotive forces of the windings act on the cross points selected as in FIG. 5(b) in such manner that the iron core 402 is excited by the magnetomotive forces of +2NI−NIx=+NI, and the bias magnetic core 701 is excited by the magnetomotive force +NIx. While, at the cross points to be released, the magnetic core 402 is excited by the magnetomotive force of −NIx, and the bias magnetic core is excited by the magnetomotive force +NIx.

Figure 5C:
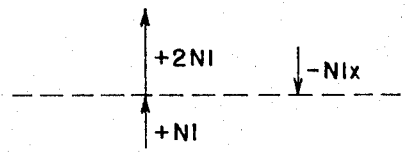

FIG. 8 show another embodiment of the invention. The connection arrangement of this embodiment is same as that shown in FIG. 7. In this embodiment, however, the magnetizing winding 702 for magnetizing the bias magnetic core 701 is connected in series to the selective winding 403 independently at each point, and a magnetomotive force necessary for the magnetization is applied to those only with respect to the selective cross points. Accordingly the power of control pulse signal is small, and this is the feature of this embodiment. The directions of magnetomotive forces of the windings in this embodiment are shown in FIG. 5(c).

The invention having the functions and arrangements as have been explained is featured by the following advantages:

1. It is possible to realize multiplex connection of switching elements located at the cross points of the input signal lines and output signal lines.

2. When selecting the switching element located at a certain specific cross point, it will suffice to flow a drive current only in the exciting winding located in position at which said winding can be magnetically coupled with said cross point. As a result, the impedance of the exciting winding becomes small and the drive power consumption can be saved.

We claim:

1. In combination in a cross point switch, comprising:
   a plurality of spaced parallel input signaling lines;
   a plurality of spaced parallel output signaling lines intersecting said input signaling lines for providing cross points therebetween;
   a plurality of switching devices, each positioned at one of said cross points and including two magnetic reeds disposed in side-by-side relation to have overlapping and movable adjacent ends normally disengaged and opposite ends joined to said input and output lines at said latter one cross point;
   a plurality of input control lines for selectively receiving voltages;
   a plurality of output control lines for selectively receiving voltages, said output control lines intersecting said input control lines at said cross points; and
   magnetic means connected to said input and output control lines at said respective cross points for controlling thereat the engagement of said overlapping adjacent reeds ends to establish make-circuits between said input and output signaling lines at said respective cross points, comprising:
   a plurality of unidirectional conductive diodes, each at each of said cross points having a first electrode connected to one of said input control lines and a second electrode;
   a plurality of first and second magnetic core means, each positioned at one of said cross points at a position proximate to said overlapping adjacent reeds ends thereat, each of said plurality of first magnetic core means producing a biasing magnetic field in a first direction tending to establish said make-circuit;
   a plurality of energizing electric windings each of which is wound on a corresponding one of said plurality of second magnetic core means and having one end connected to said second electrode at each of said cross points and an opposite end connected to a corresponding output control line, for producing an energizing magnetic field in said first direction in aiding relationship with respect to said biasing magnetic field whereby a make-circuit is established when current flows through said energizing electric winding in response to voltage applied to a preselected input control line and a preselected output control line;
   and a plurality of first series circuits each of which includes a plurality of series connected second electric windings and an output control line, each of said second electric windings being wound on a corresponding one of said plurality of second magnetic core means for producing a magnetic field in a second direction in opposing relationship with respect to said energizing magnetic field whereby make-circuits are disengaged at cross points when current flows through a series circuit in response to said voltage applied to said preselected output control line without disturbing said make-circuit established in response to voltage applied to said preselected input control line and said preselected output control line.

2. The cross point switch according to claim 1 which includes a plurality of second series circuits each of which includes a plurality of series connected third electric windings and an input control line, each of said third electric windings being wound on a corresponding one of said plurality of second magnetic core means for producing a magnetic field in said second direction in opposing relationship with respect to said energizing magnetic field whereby make-circuits are disengaged at cross-points when current flows through a series circuit in response to said voltage applied to said preselected input control line without disturbing said make-circuit established in response to voltage applied to said preselected input control line and said preselected output control line.

3. The cross point switch according to claim 1 wherein each of said plurality of first series circuits further includes a plurality of third electric windings connected in series with said second electric windings, each of said third electric windings being wound on a corresponding one of said plurality of first magnetic core means for producing said biasing magnetic field when current flows through a series circuit in response to voltage applied to said preselected input control line and said preselected output control line.

4. The cross point switch according to claim 1 wherein each of said first magnetic core means includes a third electric winding wound thereon and having one end connected to said energizing electric winding opposite end and including an opposite end connected to a corresponding series circuit for producing said biasing magnetic field when current flows through said energizing electric winding, said third electric winding and said corresponding series circuit in response to voltage applied to said preselected input control line and said preselected output control line.

5. The cross point switch according to claim 1 wherein each of said plurality of first magnetic core means comprises a permanent magnet and wherein each of said plurality of first series further includes a second unidirectional conductive diode having a first electrode connected through a common normally open switch contact to ground and a second electrode connected to said series connected second electric windings whereby said current flows through said series circuit in response to said voltage applied to said preselected output control line when said common normally open switch contact is closed.

6. The cross point switch according to claim 2 wherein each of said plurality of first magnetic core means comprises a permanent magnet and wherein each of said plurality of second series circuits further includes a second unidirectional conductive diode having a first electrode connected through a first common normally open switch contact to ground and a second electrode connected to said series connected third electric windings whereby said current flows through said series circuit in response to said voltage applied to said preselected input control line when said first common normally open switch contact is closed.

7. The cross point switch according to claim 6 wherein each of said plurality of first series circuits further includes a third unidirectional conductive diode having a first electrode connected through a second common normally open switch contact to ground and a second electrode connected to said series connected second electric windings whereby said current flows through said last-mentioned series circuit in response to said voltage applied to said preselected output control line when said second common normally open switch contact is closed.

8. The cross point switch according to claim 6 wherein each of said plurality of first magnetic core means comprises a permanent magnet; and further including:
a plurality of first normally closed switch contacts, each of which being connected between said energizing electric winding opposite end and said corresponding output control line such that each of said first normally closed switch contacts is in shunt relationship with a first series circuit; and
a plurality of second normally closed switch contacts, each of which being connected between said unidirectional conductive diode first electrode and a corresponding input control line such that each of said second normally closed switch contacts is in shunt relationship with a second series circuit, whereby current flows through a first series circuit including said preselected output control line, through a second series circuit including said preselected input control line and through an energizing electric winding in response to said voltage applied to said preselected input control line and said preselected output control line when said first and second normally closed switch contacts are opened.

9. Cross point switching apparatus comprising in combination
a plurality of spaced parallel input signaling lines;
a plurality of spaced parallel output signaling lines crossing said input lines at right angles for providing cross points therebetween;
a plurality of switching devices, each positioned at one of said cross points and including two magnetic reeds disposed in side-by-side relation to have overlapping and movable adjacent ends normally disengaged and opposite ends joined to said respective input and output lines;
a plurality of input control lines, each associated with one of said input signaling lines;
a plurality of output control lines, each associated with one of said output signaling lines;
a plurality of permanent magnets, each positioned in proximity of said overlapping two reeds adjacent ends at one of said cross points for producing a permanent magnetic field tending to move said overlapping adjacent reeds ends into engagement at a corresponding cross point;
and magnetic means connected to said input and output control lines at said respective cross points for controlling thereat the engagement and disengagement of said overlapping adjacent reeds ends to establish make-circuits and break-circuits, respectively, between said input and output signaling lines at said cross points, comprising:
a plurality of first unidirectional conductive diodes, each at each of said cross points aligned with one of said input control lines having an anode connected to a corresponding input control line and also having a cathode;
a plurality of magnetic cores, each located at one of said cross points in a position proximate to said overlapping adjacent reeds ends thereat;
a plurality of electric windings wound on each of said cores;
a first winding of said windings wound on each of said cores having one end connected to said cathode at each of said cross points aligned with one of said output control lines and an opposite end connected to said latter one output control line;
a plurality of second unidirectional conductive diodes, each having an anode and a cathode;

a first normally open switch contact connecting said anodes of said second diodes to ground;
second windings of said windings wound on said cores aligned with each of said input control lines so connected in series that one outermost end of said series-connected second windings is joined to one of said input control lines and another outermost end of said latter windings is secured to said cathode of one of said second diodes;
a plurality of third unidirectional conductive devices, each having an anode and a cathode;
a second normally open contact connecting said anodes of said third diodes to ground;
third windings of said windings wound on said cores aligned with each of said output control lines so connected in series that one outermost end of said series-connected third windings is joined to a corresponding output control line and another outermost end of said latter windings is fastened to said cathode of one of said third diodes;
whereby voltage of opposite polarities simultaneously applied to one preselected input control line and one preselected output control line cause a first current to flow in a circuit including said preselected input control line, said first diode and said first winding at said preselected input and output control lines cross point and said preselected output control line for energizing said last-mentioned first winding to activate said core associated with said last-mentioned winding to produce at said last-mentioned core a magnetic field aiding said permanent magnetic field at said last-mentioned cross point to move said overlapping adjacent reeds ends thereat into engagement to establish at said latter cross point a make-circuit between input and output signaling lines corresponding with said respective preselected input and output control lines;
closure of said first contact causes a second current to flow in a circuit including ground, said closed first contact, said second diode and said series-connected second windings aligned with said preselected input control line and said preselected input control line for energizing said latter windings to activate said cores associated with said latter windings in such manner that said second windings wound on said latter cores in a sense opposite to said first windings wound on the same cores activate said latter cores to produce thereat magnetic fields opposing said permanent magnet magnetic fields effective at said cross points aligned with said preselected input control line to disengage overlapping adjacent reeds ends proximate to said latter windings to establish break-circuits between input and output signaling lines at said cross points aligned with said preselected input control line;
and closure of said second contact causes a third current to flow in a circuit including ground, said closed second contact, said third diode and said series-connected third windings aligned with said preselected output control line and said preselected output control line for energizing said latter windings in such manner that said third windings wound on said latter cores in a sense opposite to said first windings wound on the same cores activate said latter cores to produce thereat magnetic fields opposing said permanent magnet magnetic fields effective at said cross points aligned with said preselected output control line to disengage overlapping adjacent reeds ends proximate to said latter windings to establish break-circuits between input and output signaling lines aligned with said preselected output control line; said latter energized series-connected second and third windings failing to disturb said engagement of said overlapping adjacent reeds ends at said preselected input and output control lines cross point.

10. Cross point switching apparatus, comprising in combination:
a plurality of spaced parallel input signaling lines;

a plurality of spaced parallel output signaling lines crossing said input lines at right angles for providing cross points therebetween;

a plurality of switching devices, each positioned at one of said cross points and including two magnetic reeds spaced in side-by-side relation to have overlapping and movable adjacent ends normally disengaged and opposite ends joined to said respective input and output lines;

a plurality of input control lines, each associated with one of said input signaling lines;

a plurality of output control lines, each associated with one of said output signaling lines:

a plurality of permanent magnets, each positioned proximate to said overlapping adjacent two reeds ends at each of said cross points for producing a permanent magnetic field tending to move said overlapping adjacent reeds ends into engagement at a corresponding cross point;

and magnetic means connected to said input and output control lines at said cross points for controlling thereat the engagement and disengagement of said overlapping adjacent reeds ends thereat to establish make-circuits and break-circuits, respectively, at corresponding input and output signaling lives cross points, comprising:

a plurality of first normally closed switch contacts;

a plurality of first unidirectional conductive diodes, each at each of said cross points aligned with one of said input control lines having an anode connected through one of said first contacts to one of said input control line and also having a cathode;

a plurality of magnetic cores, each located at one of said cross points in a position proximate to said overlapping adjacent reeds ends thereat;

a plurality of electric windings wound on each of said cores;

a plurality of second normally closed switch contacts;

a first winding of said windings on each of said cores having one end connected to said cathode at each of said cross points aligned with one of said output control lines and an opposite end connected through one of said second contacts to said latter one input control line;

second windings of said windings wound on said cores aligned with each of said input control lines so connected in series that one outermost end of said latter windings is joined to one input control line and another outermost end of said latter windings is connected through one of said first contacts to said latter one control line;

third windings of said windings wound on each of said cores aligned with one of said output control lines so connected in series that one outermost end of said latter windings is connected to said first windings opposite ends aligned with one of said output control lines and another outermost end is connected to said latter one control line;

whereby voltage applied to a preselected input control line and a preselected output control line causes a first current to flow in a circuit including said preselected input control line, said diode and said first winding at said preselected input and output control lines cross point, said second contact connected in said preselected output control line and said preselected output control line and said preselected output control line for energizing said last-mentioned first winding to activate said core associated with said last-mentioned winding to produce at said last-mentioned core a magnetic field aiding said permanent magnetic field at said last-mentioned cross point to move said overlapping adjacent reeds ends at said latter cross point into engagement to establish at said latter crows point a make-circuit between input and output signaling lines corresponding with said respective input and output control lines;

and, while said first and second contacts are opened, a second current is caused to flow in a circuit including said preselected input control line, said series-connected second windings connected to said preselected input control line, said diode and said first winding at said preselected input and output control lines cross point, said series-connected third windings connected to said preselected output control line and said preselected output control line for energizing said latter second and third windings to activate said cores associated with said latter windings in such sense that said latter second and third windings wound on said latter cores in a sense opposite to said windings wound on the same cores activate said latter cores to produce thereat magnetic fields effective at said cross points aligned with said preselected input and output control lines to disengage overlapping adjacent reeds ends proximate to said latter second and third windings to establish at said latter cross points break-circuits between input and output signaling circuits corresponding with said respective preselected input and output control lines, without disturbing said engagement of said overlapping adjacent reeds ends at said preselected input and output control lines cross point.

11. Cross point switching apparatus, comprising in combination:

a plurality of spaced parallel input signaling lines;

a plurality of spaced parallel output signaling lines crossing said input lines at right angles for providing cross points therebetween;

a plurality of switching devices, each positioned at one of said cross points and including two magnetic reeds disposed in side-by-side relation to have overlapping and movable adjacent ends normally disengaged and opposite ends connected to said respective input and output lines at said latter one cross point;

a plurality of input control lines, each associated with one of said input signaling lines;

a plurality of output control lines, each associated with one of said output signaling lines:

and magnetic means connected to said input and output control lines at said respective cross points for controlling thereat the engagement and disengagement of said overlapping adjacent reed ends to establish make-circuits and break-circuits, respectively, between said input and output signaling lines at said respective cross points, comprising:

a plurality of unidirectional conductive diodes, each having at each of said cross points an anode connected to one of said input control lines and cathode;

two spaced magnetic cores located at each of said cross points;

a plurality of windings positioned at each of said cross points in such manner that first and second windings are wound on one of said two cores and a third winding is wound on the other of said two cores at each of said cross points; said first windings having corresponding one ends connected to said cathodes and opposite ends connected to a common point as said latter first windings are aligned with each of said output control lines; said second and third windings so connected in series as to have one ou- termost end connected to said first windings common point and another outermost end joined to one of said output control lines as said last-mentioned first, second and third windings are aligned with each of said output control lines;

whereby voltage effective at a preselected input control line and a preselected output control line causes current to flow in a circuit including said preselected input control line, said diode and said first winding at said preselected input and output control lines cross point, said series-connected second and third windings aligned with said preselected output control line, and said preselected output control line for simultaneously energizing said last-mentioned first, second and third windings to activate said one and other cores associated therewith in such manner that said one and other cores associated with said last-mentioned first and third winding wound in the same electrical sense on said respective latter one and other cores at said preselected input and output control lines cross point produce mutually aiding magnetic fields to move said overlapping reeds end at said last-mentioned cross point into engagement to establish one of said make-circuits between said input and output signaling lines corresponding to said respective input and output control lines at said last-mentioned cross point while said second windings wound on said last-mentioned one cores in an electrical sense opposite to said third windings wound on said other cores at said respective cross-points aligned with said preselected output control line produce magnetic fields opposing said magnetic fields produced by said last-mentioned third windings to disengage overlapping adjacent reeds ends as engaged at said last-mentioned cross points to establish break-circuits between said input and output signaling circuits at said last-mentioned cross points without disturbing said engagement of said overlapping adjacent reeds ends at said preselected input and output control lines cross point.

12. Cross point switching apparatus, comprising in combination:

a plurality of spaced parallel input signal lines;

a plurality of spaced parallel output signaling lines crossing said input lines at right angles for providing cross-points therebetween;

a plurality of switching devices, each positioned at one of said cross points and including two magnetic reeds disposed in side-by-side relation and having overlapping and movable adjacent ends normally disengaged and opposite ends connected to said respective input and output lines;

a plurality of input control lines, each associated with one of said input signaling lines;

a plurality of output control lines, each associated with one of said output signaling lines;

and magnetic means connected to said input and output control lines at said respective cross points for controlling thereat the engagement and disengagement of said overlapping reeds ends to establish make-circuits and break-circuits, respectively, between said input and output signaling circuits at said respective cross points, comprising:

a plurality of unidirectional conductive diodes, each having at each of said cross points an anode connected to one of said input control lines and a cathode;

two spaced magnetic cores located at leach of said cross points;

a plurality of windings positioned at each of said cross points in such manner that first and second windings are wound on one of said two cores and a third winding is wound on the other of said two cores at each of said cross points; said first windings having corresponding one ends connected to said cathodes and having opposite ends as said first windings are aligned with said respective output control lines; said third windings having corresponding ends connected to said first windings opposite ends and having opposite ends connected to a common point as said latter first and third windings are aligned with said respective output control lines; said second windings so connected in series as to have one outermost end connected to said third windings common point and another outermost end joined to one of said output control lines as said latter first, second and third windings are aligned with each of said output control lines;

whereby voltage effective at a preselected input control line and a preselected output control line causes current to flow in a circuit including said preselected input control line, said diode and said first and third windings at said preselected input and output control lines cross point, said series-connected second windings aligned with said preselected output control line, and said preselected output control line for simultaneously energizing said latter first, second and third windings to activate said one and other cores associated therewith in such manner that said one and other cores associated with said latter first and third windings wound in the same electrical sense on said respective latter one and other cores at said preselected input and output control lines cross point produce mutually aiding magnetic fields to move said overlapping reeds ends at said latter cross point into engagement to establish one of said make-circuits between said input and output signaling lines at said latter cross point while said second windings wound on said latter one cores in an electrical sense opposite to said third windings wound on said other cores at said respective cross points aligned with said preselected output control line produce magnetic fields opposing said magnetic fields produced by said latter third windings to disengage overlapping adjacent reeds ends as engaged at said latter cross points to establish said break-circuits between said input and output signaling circuits at said latter cross points without disturbing said engagement of said overlapping adjacent reeds ends at said preselected input and output control lines cross points.

* * * * *

UNITED STATES PATENT OFFICE
CERTIFICATE OF CORRECTION

Patent No. 3,631,397                      Dated December 28, 1971

Inventor(s) Sadayuki Mitsuhashi et al

It is certified that error appears in the above-identified patent and that said Letters Patent are hereby corrected as shown below:

Column 7, line 11, "6" should be --2--.
       Column 7, lines 35-36, "combination" should be --combination:--
       Column 8, lines 28-29, "permanent magnetic" should be --permanent magnet magnetic--.
       Column 9, line 23, "lives" should be --lines--.
       Column 9, lines 60-61, "line and said preselected output control lines for energizing" should be --line for energizing--.
       Column 9, line 68, "crows" should be --cross--.
       Column 10, line 8, "said windings" should be --said first windings--.
       Column 11, line 47, "leach" should be --each--.

Signed and sealed this 20th day of June 1972.

(SEAL)
Attest:

EDWARD M. FLETCHER, JR.          ROBERT GOTTSCHALK
Attesting Officer                 Commissioner of Patents